Aug. 9, 1938.  F. C. ARTHUR ET AL  2,125,870
ALUMINUM BRONZE POWDER
Filed Nov. 11, 1930
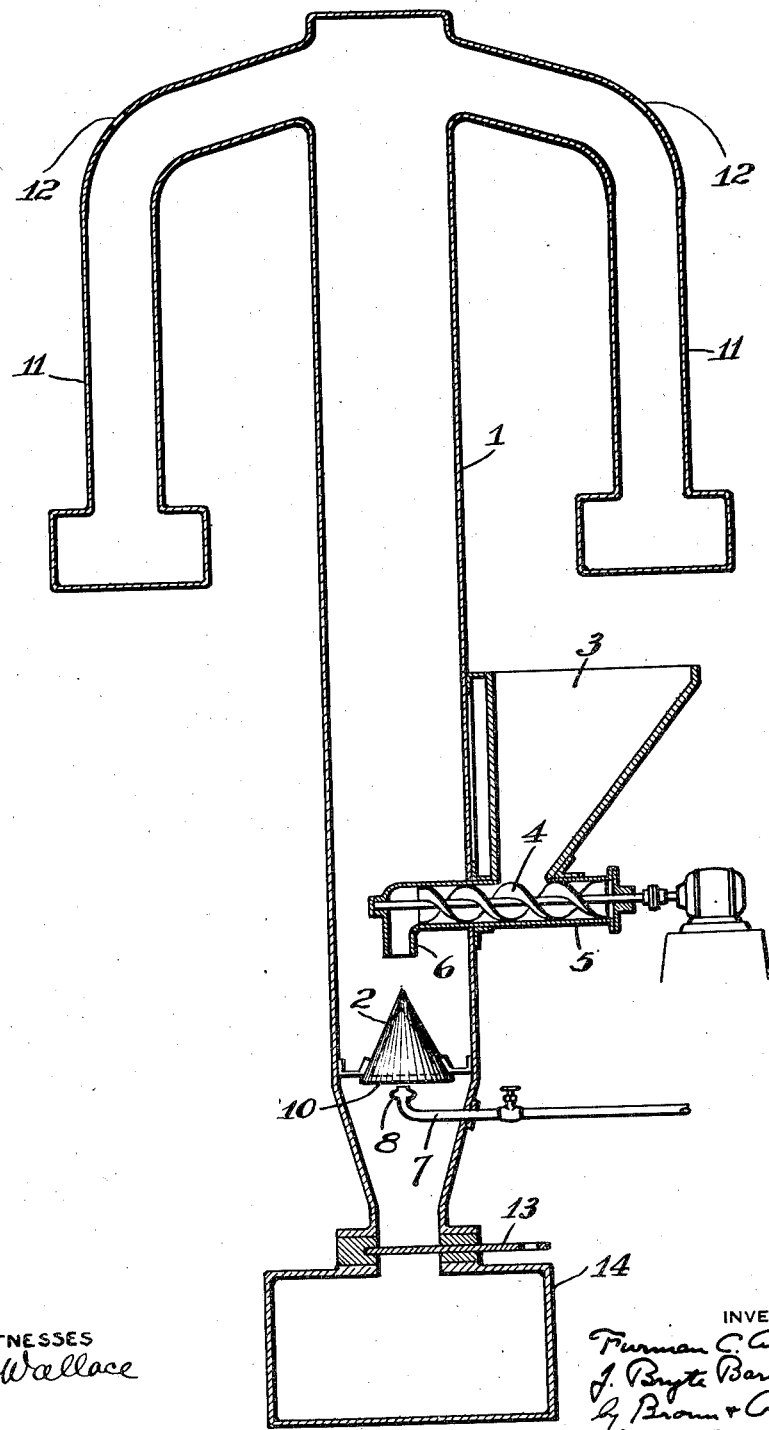

Patented Aug. 9, 1938

2,125,870

UNITED STATES PATENT OFFICE 2,125,870

ALUMINUM BRONZE POWDER

Furman C. Arthur, Oakmont, and Jesse Bryte Barnitt, Pittsburgh, Pa., assignors to Aluminum Company of America, Pittsburgh, Pa., a corporation of Pennsylvania Application November 11, 1930, Serial No. 494,872

1 Claim. (Cl. 134—76)

This invention relates to aluminum bronze powder, and its manufacture, of that size and quality generally referred to as "extra-fine lining powder", which expression is used throughout the specification, and in the appended claim to designate powder of such size that 98.5 per cent of it will pass through a screen having 325 openings to the lineal inch.

In many of the instances where aluminum bronze powder is used as a pigment to form, with a mobile vehicle, a paint, ink or similar medium for the coating or coloring of surfaces, it is important that the pigment, when applied in a vehicle to a surface, be of such nature that the resulting film presents superlative qualities of smoothness of surface, color, and brilliance. It will be readily apparent that an aluminum bronze powder suitable for use as a pigment in an outdoor paint may not have the qualities necessary to a powder which is to be used as a pigment in the decorative arts. Thus it has been repeatedly demonstrated that seemingly minute variations in the particle size, the color and the purity of aluminum bronze powder, and in the propensity of that powder to "leaf", may represent the difference between a powder suitable for use as a pigment for ordinary purposes and a powder suitable as a pigment where superlative qualities of smoothness of surface, color, and brilliance are desired.

When aluminum bronze powder is placed in satisfactory vehicles its leafing qualities are largely determined by the particle size, and it has been demonstrated that in general the smaller the particles the more efficiently will the powder "leaf". It is necessary, moreover, to the production of smooth appearing films, when the powder is applied in a vehicle to a surface, that the powder particles be somewhat uniform in size. Because the size of the particles, their color and their propensity to leaf are the governing factors to be considered in the manufacture of a powder for use in the decorative arts, many attempts have been made to provide a process by which an aluminum bronze powder of very fine size, uniform and brilliant color and excellent leafing qualities may be commercially prepared. The manufacture of aluminum bronze powder is an old art, but, as far as we are aware, prior to our invention no method has been provided by which a powder having these characteristics could be produced by a continuous operation characterized by simplicity, low expense, and such similar attributes as are necessary to the success of manufacturing operations handling large quanties of material.

The property of aluminum bronze powder known as "leafing" is the propensity of the powder particles, when stirred in a vehicle like oil or varnish, to come into the surface layer of a coating of the vehicle and powder, where the particles remain to form a continuous metallic film. Throughout this specification, and in the appended claim, this leafing property of aluminum bronze powder is referred to in quantitative terms, the measurements for which were made by means of a test well known to the art but which, in the interests of clarity, will now be described. The test consists in suspending 4 grams of aluminum bronze powder in 25 cubic centimeters of mineral spirits, meeting Federal Specification No. 16, in which is dissolved 7.5 grams of cumar resin. A test tube 6 inches long and 5/8 of an inch inside diameter is filled with this paint to a depth of 4½ inches, the temperature of the paint held between 20° and 25° C., and the temperature of the surrounding air between 20° and 30° C. The paint in the tube is stirred to secure a uniform suspension of the powder, and a spatula is dipped into the paint until it reaches the bottom of the tube, where it is allowed to remain from 5 to 10 seconds, and then withdrawn and suspended vertically in space for about two minutes. Under these conditions, leafing of the powder in the paint film on the spatula begins almost immediately and takes place most readily at the bottom of the spatula where the film is thickest, and gradually extends up the spatula with a completeness depending upon the leafing power of the paint. If leafing is not complete, there will be a certain level on the spatula above which there will be obvious cracks and "breaks" in the leafed film. Thus, if the spatula were immersed to a depth of 10 centimeters, and, after a suitable interval, the paint film had perfectly leafed to a height of 6 centimeters, then the paint is said to have a leafing power of 60 per cent.

The prior processes of manufacturing aluminum bronze powder of a fine size comparable with extra-fine lining powder have taken many forms, one of which has been the use of methods of air separation. Such methods contemplated the suspension in air of practically the entire bulk of the powder, and the ultimate classification of the powder into various sizes according to the height and time of suspension. By such methods it was possible to produce a comparatively good powder, but impossible, to the best of our knowledge, to make a complete separation. Furthermore, that part of the powder which separated as the finest size contained such quantities of large sized particles that the powder leafed in a vehicle only on the order of 80 to 90 per cent, and did not present the 100 per cent, or complete, leaf desired. Moreover, this unevenness of particle size led to unevenness of film when the powder was applied in a vehicle to a surface.

It was a further disadvantage of these prior processes that they were necessarily of the batch or intermittent type, capable of producing only small quantities of an extra-fine powder in one single operation. One of the outstanding faults of these prior processes has been the steps heretofore thought necessary as precedent to the air separation step. In the well known processes of reducing aluminum to a powder, properly prepared aluminum stock is placed in powder stamps and stamped for about 6 to 8 hours. The resulting powder is of a standard grade which may be generally used for many purposes, but it varies considerably in size, only about 50 to 60 per cent of it passing through a 325 mesh screen. Thus, if this material were to be used in prior air separation processes where all of the powder is suspended in the air stream, it would be necessary to suspend a bulk of powder, 40 to 50 per cent of which could not under any circumstances be recovered as the desired extra-fine product.

The prior processes of air separation were predicated on the theory that longer stamping of the aluminum stock would place more of the initial powder in an extremely fine state of subdivision, and thus enable a larger proportion of the extra-fine powder to be recovered when the entire bulk of the powder was suspended in air. However, aluminum bronze powder, when stamped for long periods, becomes dark in color and does not produce, when applied in a vehicle, the light and brilliant surface desired. Accordingly, a long stamping operation preliminary to the prior air separation processes was deleterious to the production of an extra-fine powder of the color and brilliance desired. Moreover, long stamping operations are a departure from the practice of making standard grades of powder, and are consequently not desirable since the larger amount of aluminum bronze powder used is of the standard grade.

An object of this invention is to provide a simple, effective and economical method of air-separating aluminum bronze powder to produce an extra-fine lining powder of good color and excellent leafing qualities.

A further object is to provide a method of air separation of aluminum bronze powder which may be practiced in conjunction with the commercial processes now operated to produce powder of standard grade, and as a single and continuous step thereof.

Another object is to provide an aluminum bronze powder, 98.5 to 99.5 per cent of which will pass through a screen having 325 openings to the lineal inch, and which will, in a test vehicle such as described above, having a leafing power of 99 to 100 per cent.

Our invention is predicated upon our discovery that if aluminum bronze powder is allowed to gravitationally descend through a lifting air stream which is of such force that only part of the very fine particles are lifted or buoyed up, while a great part of the entire bulk of the aluminum bronze powder (in some cases not more than 85 per cent and usually as much as 95 per cent) is not lifted by the air stream, the powder lifted out of the bulk of the powder by the gently rising air stream is uniformly of a size which will pass through a 325 mesh screen, no appreciable amount of large powder particles being lifted. The disadvantage of prior air separation processes not heretofore recognized is that, as we have discovered, where the bulk of the finer powder is floated the differences in sizes and weights between particles, less and greater in size than those which will pass a 325 mesh screen, are so minute that a sharp division between critical sizes cannot be obtained. However, if the bulk of the powder is allowed to fall through a gently rising air stream of sufficient volume and velocity to lift the fine sized powder particles, and of insufficient power to lift the large sized particles, the separation is selective and to a large extent quantitative.

In practicing our improved method, we have found it desirable to effect an air separation under such conditions that only a comparatively small amount of the desirable fines are lifted from the bulk of the powder. The amount of powder lifted in extreme cases is not usually more than 15 per cent, and, in some cases, we prefer to only lift as low as 2½ per cent of the total bulk of the powder. The removal of such a small percentage of the total bulk of the powder was not feasible by prior air separation operation, because the entire powder was suspended and the operation was of such magnitude that it could not be commercially operated when such small amounts were recovered. However, as will hereinafter be explained, our process may be practiced continuously, and as an incidental step between the stamping operation and the grading processes by which aluminum bronze powder of ordinary quality is produced.

While our improved method of air-floating only the very fine material, and allowing the remainder to settle through the air stream without being lifted or floated by the air, may be practiced by means of any suitable apparatus in which the conditions hereinafter described may be maintained, in the practice of our invention we have used certain preferred types of apparatus such as illustrated in the accompanying drawing which diagrammatically represents a sectional elevation of an air-separating device.

Referring to the drawing, the air-separating device comprises a vertically disposed air chamber 1 in which a cone 2 is suitably located. Aluminum bronze powder is placed in a feed hopper 3, from where it is fed to a position above the cone by a screw conveyor 4 arranged in a feed tube 5 extending below the hopper. At the bottom of the feed tube, and immediately over the apex of cone 2, is an orifice 6 from which the powder is discharged from the feed tube directly onto the apex of the cone. In the form of cone shown in the drawing, the air supply from a conduit 7 is directed by a nozzle 8 against the center of a flat base plate 10 of the cone. The air flows evenly to the edge of the cone where it meets the downwardly falling powder and carries fine particles of it upwardly. Extending laterally and downwardly from the upper end of air chamber 1 there are a plurality of collectors 11 for fine powder, these being provided with small openings 12 for the escape of air. At the lower end of the air chamber there is a valve 13 for controlling the passage of larger particles of powder into a bin or hopper 14.

Although we prefer the type of air cone thus shown and described, air may be led into the interior of a cone provided with perforations through which the air escapes to meet the powder flowing downwardly on the surface of the cone.

Our method may be practiced in conjunction with any standard method of making aluminum bronze powder, or the powder may be prepared by any special method designed to lend to the air separation a greater efficiency. As has been pointed out, however, it is an outstanding advantage of our process that it may be operated as a continuous step in the production of standard grades of aluminum bronze powder by known and practiced methods. The preferred adaptation of our method to a standard method of making aluminum bronze powder will now be described.

Aluminum stock, which may consist of scrap metal or other metal cut into small pieces, is fed into a stamping machine which may be of a rotary or a similar well known type. The stock is stamped for a period of 6 to 8 hours, at the end of which time an aluminum bronze powder is obtained which in size and quality is of that grade commonly referred to as standard varnish grade, generally used as a pigment in a substantial proportion of aluminum paint. As has been mentioned, this powder contains about 50 to 60 percent of particles of a size which will pass through a 325 mesh screen and which are therefore of the size desired in the grade known as extra-fine lining powder. The stamped powder may then be immediately subjected to the air separation method according to our invention or it may be polished before air separation. While either is feasible, we prefer to polish the powder immediately after the stamping operation and prior to air separation. For this purpose, the powder is submitted to the well known polishing process which consists in placing the powder in a cylindrical drum or similar mechanism in which are movable rotary or other polishing devices. To the powder is added a small amount of polishing lubricant, all of which is well known to standard practice in the art. During the polishing operation, which may continue from 8 to 12 hours, the flakes of powder are smoothed by causing them to rub against each other, and each flake is coated with an extremely thin film of lubricant which gives the flakes or particles the ability to leaf.

After the polishing operation, the powder is conveyed to the feed hopper 3 of the air separation apparatus above described, and from there it is fed by means of the screw conveyor through the feed tube 5 to its orifice 6 where it falls upon the air cone 2. Simultaneously, air is fed into or discharged below the cone at a nozzle pressure and volume rate depending largely upon the diameter of the air chamber. By way of example, and not of limitation, in a chamber 18 inches in diameter, the air may enter at the rate of 31 cubic feet per minute. As the powder flows over the conical walls of the air cone, the gently rising air passes through the powder in a substantially countercurrent manner. The bulk of the powder, being of a size not lifted by a current of air of this velocity, falls directly into the bottom of the air chamber 1, from whence it is removed from time to time by opening the valve 13 above the storage tank 14. A portion of the powder which, during the stamping operation, was placed in a very finely divided condition, is raised by the gently rising air into the upper portion of the air chamber 1 and is there carried over into the collectors or hoppers 11, finally falling to their bottoms from which it may be removed in any convenient manner. A uniform flow of the air from the air chamber and hoppers 11 is effected by the openings 12 which allow the air to so escape that a steady flow of it is maintained between the air cone and the top of the air chamber.

In the practice of our invention, the air chamber is of considerable height so that the passage of the particles from the air cone to the top of the chamber is not rapid. In this way we avoid the possibility of larger powder particles than the ones desired being carried by the gently rising air stream to the top of the air chamber and hence to its appended hoppers 11. By providing a chamber of considerable length, we have found that any large particles which may rise do not reach the top of the air chamber, but fall downwardly past the cone and into the bottom of the chamber. For this purpose we preferably maintain an air chamber distance of about 15 to 20 feet between the apex of the cone and the lower edge of the passages in the air chamber leading to the hoppers 11.

The product which is lifted by the air and separated from the bulk of the aluminum bronze powder by the method of air separation above described is extremely fine in size. At least 98.5 per cent of it will pass through a mesh screen containing 325 openings to the lineal inch. In a comparison of the powder produced according to our invention with other powders produced for the same purpose but in other ways, it has been found that whereas the other finely sized powders have leafing properties varying from 40 to 95 per cent, that produced in accordance with our invention possesses much higher leafing properties, it having been consistently produced commercially with leafing properties of 100 per cent.

According to the provisions of the patent statutes, we have described the principle of our invention, and have explained specifically how it may be practiced. However, we desire to have it understood that, within the scope of the appended claim, our method may be practiced otherwise than as specifically described, and that our product has substantial advantages regardless of how it may be produced.

We claim as our invention:

As a new product fine aluminum bronze powder having the property of substantially complete leafing in a vehicle to present a brilliant, smooth surface, and composed of particles of such fineness that at least 98.5 per cent will pass through a screen having 325 openings to the lineal inch.

FURMAN C. ARTHUR.
J. BRYTE BARNITT.